US012643532B2

(12) United States Patent　(10) Patent No.:　US 12,643,532 B2
Bora et al.　(45) Date of Patent:　*Jun. 2, 2026

(54) WHEEL SLIP-BASED CONTROL FOR ACCELERATING AND DECELERATING HEAVY-DUTY VEHICLES

(71) Applicant: VOLVO TRUCK CORPORATION, Gothenburg (SE)

(72) Inventors: Teodoro Bora, Gothenburg (SE); Viktor Lägnert, Gothenburg (SE); Ramadan Salif, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 56 days.

This patent is subject to a terminal disclaimer.

(21) Appl. No.: 18/710,804

(22) PCT Filed: Nov. 17, 2021

(86) PCT No.: PCT/EP2021/082046
§ 371 (c)(1),
(2) Date: May 16, 2024

(87) PCT Pub. No.: WO2023/088556
PCT Pub. Date: May 25, 2023

(65) Prior Publication Data
US 2025/0010845 A1　Jan. 9, 2025

(51) Int. Cl.
*B60W 30/02*　(2012.01)
*B60W 30/18*　(2012.01)
(52) U.S. Cl.
CPC ...... *B60W 30/02* (2013.01); *B60W 30/18172* (2013.01); *B60W 2520/105* (2013.01); *B60W 2520/26* (2013.01)

(58) Field of Classification Search
CPC . B60T 8/175; B60W 30/18172; B60W 30/30; B60W 2520/10; B60W 2520/105; B60W 2520/26
See application file for complete search history.

(56) References Cited

U.S. PATENT DOCUMENTS 4,653,816 A　3/1987　Lin
4,886,140 A　12/1989　Leiber et al.
(Continued)

FOREIGN PATENT DOCUMENTS

EP　0700343　B1　1/2000
EP　3299237　A1　3/2018
WO　2019072379　A1　4/2019

OTHER PUBLICATIONS

Tyre and vehicle dynamics, Elsevier Ltd. 2012, ISBN 978-0-08-097016-5, by Hans Pacejka, 400 pages.
(Continued)

*Primary Examiner* — Gonzalo Laguarda
(74) *Attorney, Agent, or Firm* — Jeffri A. Kaminski; Venable LLP

(57)　ABSTRACT
A method for controlling motion by a heavy-duty vehicle is provided. The vehicle is controlled based on a target longitudinal wheel slip of at least one driven wheel on the vehicle. The method includes monitoring a signed acceleration of the vehicle, monitoring a signed current longitudinal wheel slip of the at least one driven wheel, and, if the monitored acceleration and the current longitudinal wheel slip has the same sign, reducing a magnitude of the target longitudinal wheel slip of the at least one driven wheel in case a magnitude of the monitored acceleration of the vehicle decreases while the magnitude of the monitored current longitudinal wheel slip is non-decreasing, and controlling wheel slip of the at least one driven wheel based on the target longitudinal wheel slip.

18 Claims, 5 Drawing Sheets

(56)             References Cited

U.S. PATENT DOCUMENTS

|  |  |  |  |
|---|---|---|---|
| 5,707,121 A | 1/1998 | Harris et al. | |
| 5,737,714 A | 4/1998 | Matsuno et al. | |
| 6,109,704 A | 8/2000 | Batistic | |
| 6,241,326 B1 | 6/2001 | Ferguson et al. | |
| 12,397,758 B2 * | 8/2025 | Laine ...................... B60T 8/171 | |
| 2009/0107748 A1 | 4/2009 | Luehrsen et al. | |
| 2009/0112437 A1 | 4/2009 | Luehrsen et al. | |
| 2010/0114447 A1 | 5/2010 | Moriki et al. | |
| 2013/0144476 A1 | 6/2013 | Pinto et al. | |
| 2023/0047444 A1 * | 2/2023 | Henderson ...... B60W 30/18172 | |
| 2023/0120062 A1 * | 4/2023 | Henderson ............. B60T 8/175 | |
| | | | 701/71 |
| 2024/0391434 A1 * | 11/2024 | Bora ....................... B60T 8/175 | |

OTHER PUBLICATIONS

International Search Report and Written Opinion of the International Searching Authority in corresponding International Application No. PCT/EP2021/082046 dated Nov. 17, 2021 (8 pages).

* cited by examiner

300

350

500

WHEEL SLIP-BASED CONTROL FOR ACCELERATING AND DECELERATING HEAVY-DUTY VEHICLES

CROSS-REFERENCE TO RELATED APPLICATIONS

This application is a U.S. National Stage application of International Application No. PCT/EP2021/082046, filed Nov. 17, 2021 and published on May 25, 2023 as WO 2023/088556, all of which is hereby incorporated by reference in its entirety.

TECHNICAL FIELD

The present disclosure relates to vehicle motion management for heavy-duty vehicles, i.e., coordinated control of motion support devices such as service brakes, propulsion devices and power steering. The invention can be applied in heavy-duty vehicles such as trucks, buses, and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSDs). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion and power management (VMPM) functionality executed, e.g., on a central vehicle control unit (VCU) or distributed over a network of electronic control units (ECU) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy-duty vehicle. The VMPM control may advantageously be based on wheel speed requests or wheel slip requests transmitted from the VMPM to MSD control units which control the various MSDs by low delay-high bandwidth control loops targeted at maintaining wheel behaviour as close as possible to the requested wheel slip or wheel speed values. VMPM control may also comprise more traditional torque-based requests that are transmitted from the VMPM to the MSD control units.

Wheel slip-based control strategies usually rely on some model of the relationship between tyre force and wheel slip. Obtaining high accuracy of such models is typically a challenging task. For example, a model may rely on surface characteristics, which may vary along a route and is often difficult to accurately infer from sensors. Wheel slip-based control, such as imposing a wheel slip limit, therefore tend to use models of some average scenario, which is suboptimal in most cases. There is a need for improved wheel slip-based control methods and control architectures.

SUMMARY

It is an object of the present disclosure to provide methods and control units for improved vehicle control. This object is at least in part obtained by a method for controlling motion by a heavy-duty vehicle arranged to be controlled based on a target longitudinal wheel slip or wheel speed in relation to vehicle speed of at least one driven wheel on the vehicle. The method comprises monitoring a signed acceleration of the vehicle as well as a signed current longitudinal wheel slip of the at least one driven wheel, i.e., an acceleration value and a wheel slip value which may assume both positive and negative values, where the sign convention is defined in relation to a reference direction of the vehicle. In cases where the monitored acceleration and the current longitudinal wheel slip has the same sign, the method comprises reducing a magnitude of the target longitudinal wheel slip of the at least one driven wheel in case a magnitude of the monitored acceleration of the vehicle decreases while the magnitude of the monitored current longitudinal wheel slip is non-decreasing or increasing and controlling wheel slip of the at least one driven wheel based on the target longitudinal wheel slip.

The disclosed method is applicable both for propulsion (positive acceleration) and for retardation (braking) for vehicles driving in the forward direction as well as reversing. The method may, for instance, be performed when the signed acceleration of the vehicle is a positive acceleration and the signed current longitudinal wheel slip is a positive wheel slip, corresponding to a vehicle propulsion operation (in either the forward or in the reverse direction). The method then specifies reducing the target longitudinal wheel slip of the at least one driven wheel in case the monitored acceleration of the vehicle decreases while the monitored current longitudinal wheel slip is non-decreasing or increasing.

The reduction of the target longitudinal wheel slip can be an intervention intended to act as a safety net on top of a base target slip calculation to cope with the uncertainties involved in such (calculated from, e.g., a tyre model). In other words, the disclosed method can adjust a base slip target that is sub-optimum in a certain situation to a more suitable value for vehicle control. The present disclosure can dynamically update the wheel slip target. This, e.g., increases the chance to avoid vehicle stalling due to a sub-optimum base target slip. In the disclosed method, the target slip can be purely measurement based and it does not require knowledge about the surface, vehicle, tires, or any other environmental condition known as correlated with friction, which are commonly required in other wheel slip-based control methods, which is an advantage.

It is normally undesired to be in a scenario where acceleration is decreasing at the same time as longitudinal wheel slip is increasing or is maintained, since this may be indicative of that the tyre force has entered into a non-linear region in the relationship between longitudinal wheel slip and tyre force. The disclosed method therefore controls wheel slip using an algorithm which will interfere by reducing the target slip as soon as it realizes that the vehicle is losing acceleration while the slip is either kept steady or increased. This provides a simple yet effective control scheme for the vehicle. For example, if a vehicle is to be driven, or launched, on an up-hill gravel road, the base target slip may be set too high, and cause the vehicle to slip excessively, loosing acceleration. Since the monitored acceleration of the vehicle decreases due to excessive wheel slip, while the monitored current longitudinal wheel slip is non-decreasing, the target wheel slip will be reduced to a more suitable value for driving up the gravel road.

The methods disclosed herein can also be performed when the signed acceleration of the vehicle is a negative acceleration and the signed current longitudinal wheel slip is a negative wheel slip, corresponding to a vehicle braking operation (either in the forward direction or when reversing). In this case the method specifies to increase the target longitudinal wheel slip of the at least one driven wheel in case the monitored acceleration of the vehicle increases (becomes less negative) while the monitored current longitudinal wheel slip is non-increasing or decreases (becomes more negative). This behaviour by the vehicle improves braking performance in the same manner as the propulsion performance is improved during positive acceleration. In case it is desired to brake a heavy-duty vehicle, and it is determined that the wheel slip becomes more negative (increases in magnitude) at the same time as the acceleration becomes less negative (decreases in magnitude), then the target longitudinal wheel slip for the braking operation is increased in order to improve the braking wheel force. This mitigates issues related to incorrect inverse tyre models that map tyre force to wheel slip during braking, making the braking operation more resilient to modelling errors, which is an advantage.

As mentioned above, the sign of the monitored acceleration and the sign of the current longitudinal wheel slip is defined relative to a reference vehicle speed direction. Thus, if the vehicle is travelling in a forward direction, a positive wheel slip is a wheel slip which provides a positive wheel force in the forward direction, while a negative wheel force is one that brakes the vehicle. For a reversing vehicle the same is true, i.e., a positive wheel slip is one which generates a positive wheel force in the reverse direction and a negative wheel slip slows the vehicle down during the reversal manoeuvre.

In case the monitored acceleration and the current longitudinal wheel slip has different signs, then an undesired event has likely occurred, and the method optionally comprises triggering an emergency routine in case this happens. For instance, the heavy-duty vehicle could be slipping in forward direction down a hill while the wheels are spinning in reverse direction, or the heavy-duty vehicle could be slipping backwards down a slope while the wheels are spinning in the forward direction. The emergency routine could, e.g., comprise triggering a traction control system, and emergency stop system, or some other situation avoidance manoeuvre. Such emergency routines are out of scope of the present disclosure.

The target longitudinal wheel slip after the magnitude reduction may be determined in different ways, for instance based on the current longitudinal wheel slip or based on a previous target longitudinal wheel slip, as will be explained in detail below.

The method may also comprise increasing the magnitude of the target longitudinal wheel slip of the at least one driven wheel in case the magnitude of the monitored acceleration of the vehicle does not decrease while the magnitude of the monitored current longitudinal wheel slip is non-decreasing. This mechanism may improve the ability by the heavy-duty vehicle to generate wheel force in difficult situations, since the allowable wheel slip magnitude is allowed to be increased when this is deemed to result in an increased wheel force capability. Overall, this provides an adaptive vehicle control system able to adjust its operation to the current operating conditions in an advantageous manner.

The method may furthermore comprise reducing the magnitude of the target longitudinal wheel slip of the at least one driven wheel in case the magnitude of the monitored acceleration of the vehicle increases while the magnitude of the monitored current longitudinal wheel slip decreases. Again, this behaviour by the heavy-duty vehicle may increase the wheel force generating capability of the heavy-duty vehicle, which is an advantage. The feature also provides for a more adaptive control system able to adjust to various operating conditions of the heavy-duty vehicle.

According to aspects, the target wheel slip is determined based on a change in acceleration by the vehicle and/or based on a change in current longitudinal wheel slip. Basing the target wheel slip on the magnitude(s) of the change in acceleration and/or in current wheel slip can be a good way of faster reaching a desired and optimal current wheel slip.

According to aspects, the target wheel slip is determined based on a weighted combination of the change in acceleration and the change in current longitudinal wheel slip. This way, weighting/normalization factors can be selected to adjust the relative importance of the acceleration change and the wheel slip change has on the target wheel slip. The factors can comprise weighting and/or normalization and may be set in dependence of a current transport mission, a current operating environment, and/or a current vehicle type or load.

According to aspects, the target wheel slip is determined based on the change in acceleration and the change in current longitudinal wheel slip together with a loop gain factor. This way, the change rate of the target wheel slip can be controlled more efficiently, as will be explained in more detail below. The loop gain factor can be configured differently is the monitored acceleration of the vehicle decreases or not, while the monitored current longitudinal wheel slip is non-decreasing. This way, the target wheel slip can stabilize around a certain value, meaning that, in an unlikely steady-state situation, the slip target becomes asymptotically stable.

According to aspects, the loop gain factor and/or factors in the weighted combination are dynamically updated based on a driving scenario. The relative importance of the acceleration change compared to the wheel slip change may be different for different scenarios, such as different ground conditions with different friction. Similarly, it may be desired to adjust the change rate (i.e., the loop gain) for different scenarios.

According to aspects, the current longitudinal wheel slip is determined from a speed difference between a driven wheel and a non-driven wheel. This is a simple yet accurate way of obtaining the wheel slip.

According to aspects, the acceleration is obtained from an accelerometer. This provides a cost-effective way of obtaining accurate acceleration values. Alternatively, or in combination of, the acceleration is obtained from a speed of the vehicle. Sensors such as a radar or lidar sensor can of course also be used to determine vehicle acceleration in an accurate manner.

According to aspects, the acceleration is a longitudinal acceleration of the driven wheel. This way, the acceleration can be related to wheel slip via a tyre model.

There is also disclosed herein computer programs, computer readable media, computer program products, control units, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

Figure 1:
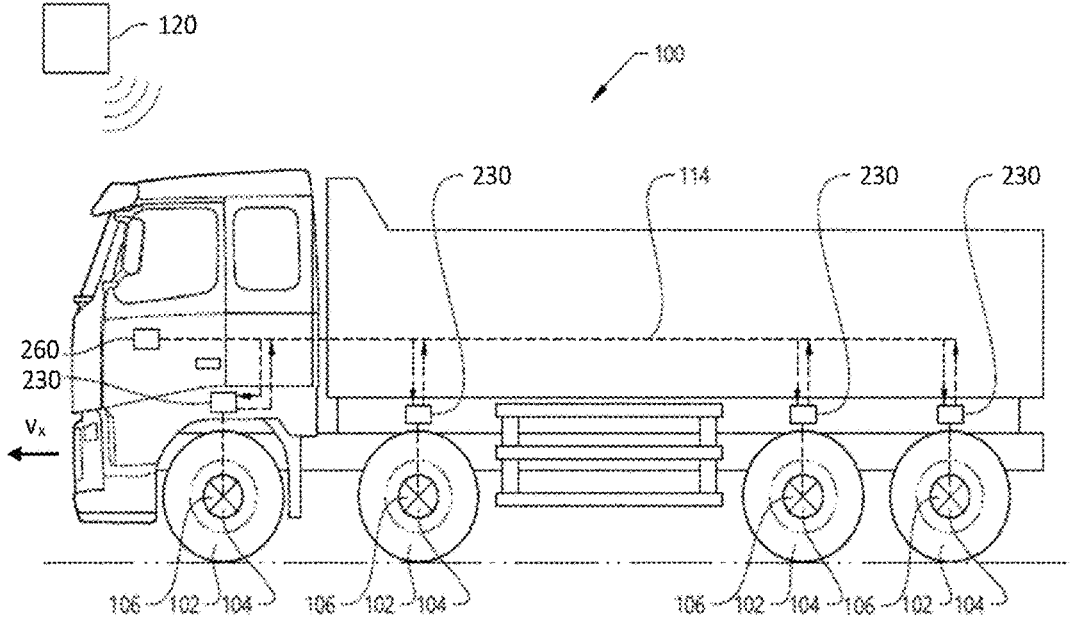
FIG. 1 is a lateral side view illustrating an example heavy-duty vehicle.

DETAILED DESCRIPTION OF EXAMPLE
EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

With reference to FIG. 1, there is depicted a vehicle 100 in the form of a truck. The vehicle comprises a plurality of wheels 102, wherein each of the wheels 102 comprises a respective motion support device (MSD) 104. Although the embodiment depicted in FIG. 1 illustrates an MSD for each of the wheels 102, it should be readily understood that, e.g., one pair of wheels 102 may be arranged without such an MSD 104. Also, an MSD may be arranged connected to more than one wheel, e.g., via a differential arrangement. Further, the MSDs 104 are preferably MSDs for generating a torque on a respective wheel of the vehicle or for both wheels of an axle. The MSD may be a propulsion device, such as an electric machine 106 arranged to e.g., provide a longitudinal wheel force to the wheel(s) of the vehicle 100. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

The vehicle has an associated forward direction, in which it may move with velocity $v_x$. However, the vehicle 100 may also move in an opposite direction when it is reversing. The direction of motion of the vehicle may serve as a reference direction of motion. This reference direction will be discussed in more detail below when discussing longitudinal wheel slip.

At least a subset of the MSDs 104 is connected to a respective MSD control system 230 arranged for controlling operation of the MSD 104. The MSD control system 230 is preferably a decentralized motion support system 230, although centralized implementations are also possible. It is furthermore appreciated that some parts of the MSD control system may be implemented on processing circuitry remote from the vehicle, such as on a remote server 120 accessible from the vehicle via wireless link. Also, each MSD control system 230 is connected to a vehicle motion management (VMM) system or function 260 of the vehicle 100 via a data bus communication arrangement 114 that can be either wired, wireless or both wired and wireless. Hereby, control signals can be transmitted between the vehicle motion management system 260 and the MSD control system 230. The vehicle motion management system 260 and the MSD control system 230 will be described in further detail below with reference to FIG. 2 and FIG. 5.

Generally, an MSD on the vehicle 100 may also be realized as, e.g., a friction brake, a power steering device, active suspension, and the like. Notably, these MSDs are often coordinated in order to obtain a desired motion by the vehicle. For instance, two or more MSDs may be used jointly to generate a desired propulsion torque or braking torque.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The VMM function 260 as well as the MSD control system 230 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 6.

Figure 2:
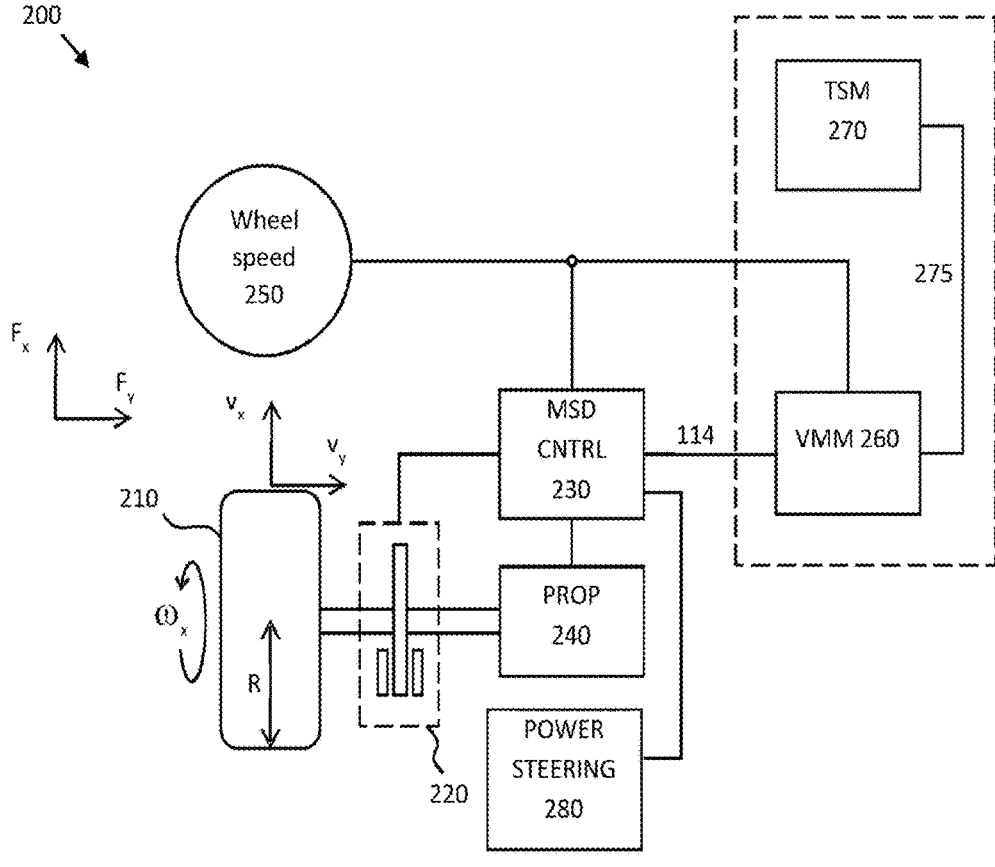
FIG. 2 shows an example motion support device control arrangement.

FIG. 2 shows an example MSD control arrangement for use, e.g., in the heavy-duty vehicle 100. The control architecture is a layered functional architecture where some functionality is comprised in a traffic situation management (TSM) function 270 in a higher layer and some other functionality is comprised in the VMM function 260 residing in a lower functional layer. FIG. 2 schematically illustrates functionality 200 for controlling an example wheel 210 on the vehicle 100 by some example MSDs here comprising a friction brake 220 (such as a disc brake or a drum brake), a propulsion device 240 and a steering arrangement 280. The friction brake 220 and the propulsion device are examples of wheel torque generating devices, which can be controlled by one or more motion support device control units 230. The control is based on, e.g., measurement data obtained from a wheel speed sensor 250 and from other vehicle state sensors, such as radar sensors, lidar sensors, and also vision based sensors such as camera sensors and infra-red detectors. An MSD control function 230 may be arranged to control one or more actuators. For instance, it is not uncommon that an MSD control system 330 is arranged to control both wheels on an axle.

The TSM function 270 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 260 which performs force allocation to meet the requests from the TSM function in a safe and robust manner. The VMM function 260 operates on a time-scale of below one second or so and will be discussed in more detail below.

The wheel 210, e.g., one of the wheels 102 of the vehicle 100, has a longitudinal velocity component $v_x$ and a lateral velocity component $v_y$. There is a longitudinal wheel force $F_x$ and a lateral wheel force $F_y$, and also a normal force $F_z$ acting on the wheel (not shown in FIG. 2). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $w_x$, and a radius R.

Figure 3A:
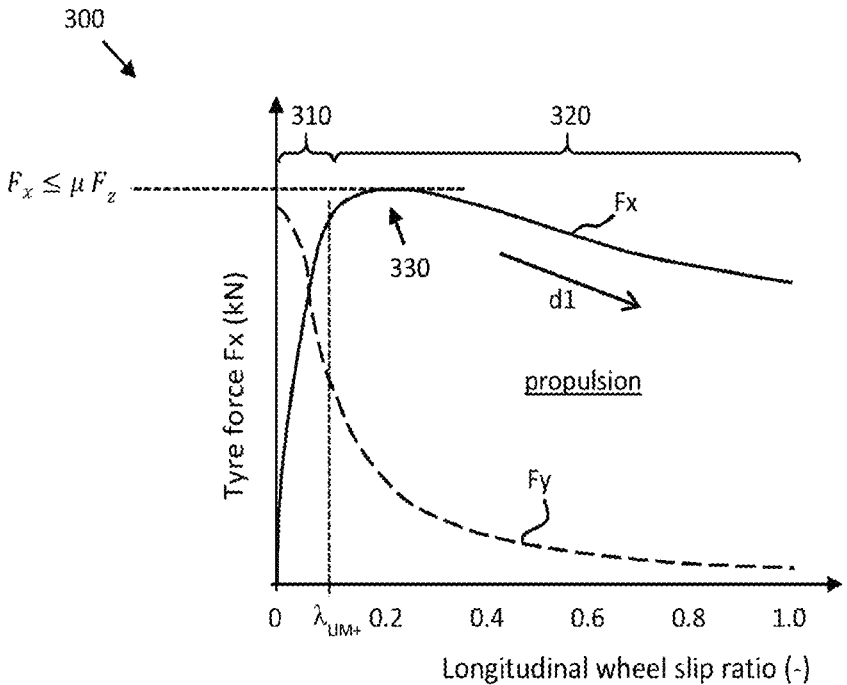
FIGS. 3A-3B are graphs showing example tyre forces versus wheel slip.

FIG. 3A is a graph showing an example 300 of achievable tyre force as function of longitudinal wheel slip. Longitudinal wheel slip $\lambda_x$ may, in accordance with SAE J670 (SAE Vehicle Dynamics Standards Committee Jan. 24, 2008) be defined as $$\lambda_x = \frac{R\omega_x - v_x}{\max(|R\omega_x|, |v_x|)}$$

Where R is an effective wheel radius in meters, $w_x$ is the angular velocity of the wheel, and $v_x$ is the longitudinal speed of the wheel (in the coordinate system of the wheel) in the direction of motion of the vehicle 100. This direction may be in the forward direction of the vehicle in case the vehicle is moving forward or in the reverse direction opposite to the forward direction if the vehicle is reversing. The wheel slip $\lambda_x$ is a signed quantity which is bounded between $-1$ and 1 and indicates how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM 260 and optionally also the MSD control system 230 maintains information on $v_x$ (in the reference frame of the wheel), while a wheel speed sensor or the like can be used to determine $\omega_x$ (the rotational velocity of the wheel). Note that $v_x$ points in the forward direction as in FIG. 1 if the vehicle drives forward while it points in the opposite direction if the vehicle is reversing.

In order for a wheel (or tyre) to produce a wheel force, slip must occur. For smaller slip values the relationship between slip and generated force are approximately linear, where the proportionality constant is often denoted as the slip stiffness of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

The longitudinal tyre force $F_x$ shows an almost linearly increasing part 310 for small wheel slips, followed by a part 320 with more non-linear behaviour for larger wheel slips. Note that the achievable tyre force drops with $\mu$, and that the peak value 330 normally shifts in dependence of the driving conditions.

FIG. 3A also shows an obtainable lateral tyre force $F_y$, which decreases rapidly even at relatively small longitudinal wheel slips. It is desirable to maintain vehicle operation in the linear region 310 also because enough lateral tyre force can be generated there if needed. If the current wheel slip passes too far beyond the peak 330, almost no lateral force is possible to generate, which may result in the vehicle sliding off the road, or failing to perform a cornering maneuver. It is also desirable to maintain vehicle operation in the linear region 310 since the obtainable longitudinal force in response to an applied brake command is easier to predict in this region. To ensure operation in this region, a wheel slip limit $\lambda_{lim+}$ on the order of, e.g., +0.1, can be imposed on a given wheel. For larger wheel slips, e.g., exceeding +0.1, a more non-linear region 320 is seen. Control of a vehicle in this region may be difficult and is therefore often avoided. It may be interesting for traction in off-road conditions and the like where a larger slip limit for traction control might be preferred, but not for on-road operation.

The interface between VMM and MSDs capable of delivering steering and optionally also torque to the vehicle's wheels has, traditionally, been focused on torque-based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface between VMM 260 and the MSD controller or controllers 230, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

Figure 3B:
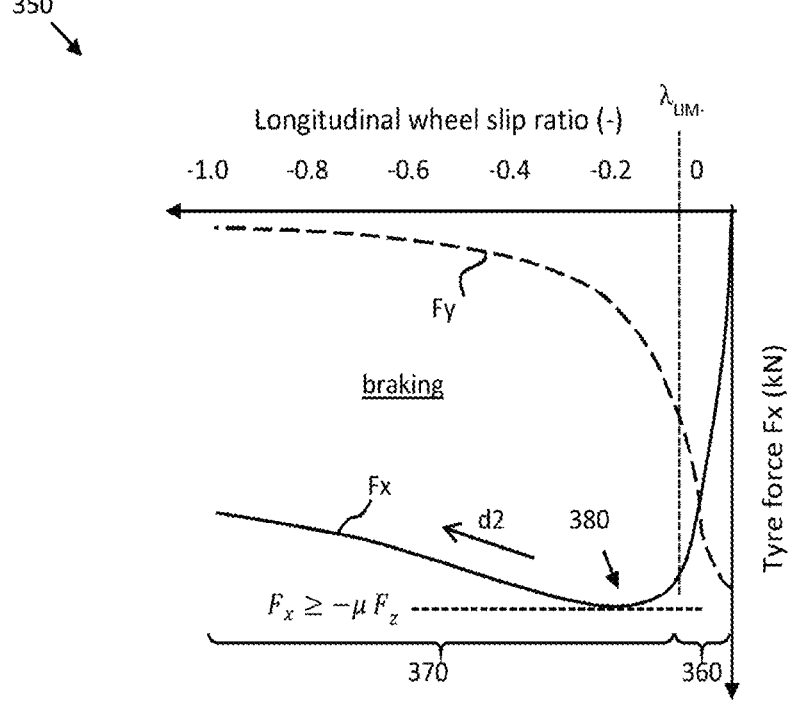

FIG. 3B illustrates an example 350 of tyre forces in dependence of wheel slip during braking, i.e., when a negative wheel slip is applied at the wheel 210. This curve is essentially the inverse of the example curve 300. The retardation tyre model may be different, but this curve is a good example which serves the purpose of explaining the herein proposed techniques. This curve also exhibits a linear region where it is desired to control the vehicle, in order to avoid nonlinearity and loss of lateral force capability which is seen for more negative wheel slips.

Figure 5:
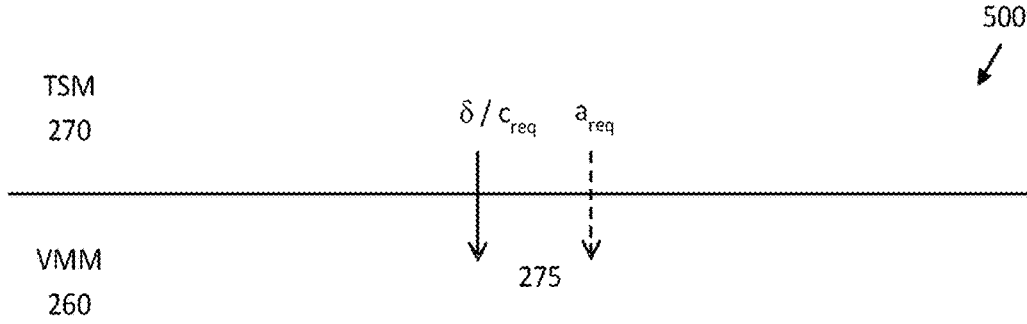
FIG. 5 illustrates an example vehicle control function architecture.
Figure 5:
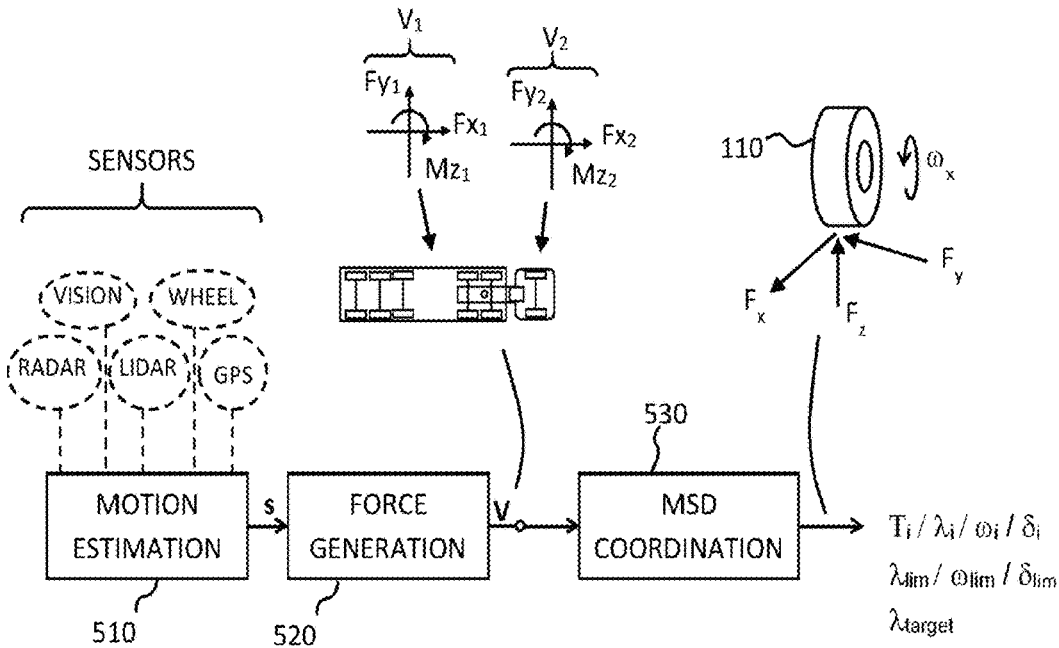
Figure 5:
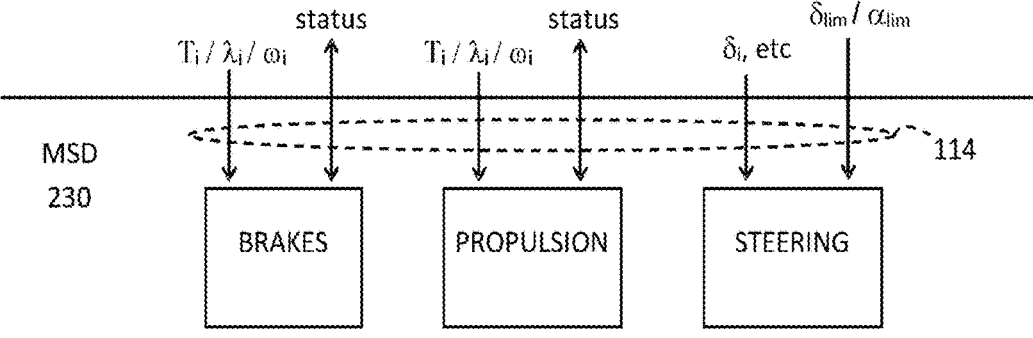

Turning now to FIG. 5, the overall vehicle control system 500 may be implemented on one or more vehicle unit computers (VUC). The VUC may be configured to execute vehicle control methods which are organized according to a layered functional architecture as discussed above.

The type of tyre models 300, 350 shown in FIGS. 3A and 3B can be used by the VMM function 260 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip or speed instead. The main advantage being that the MSD control device 230 will be able to deliver the requested torque with much higher bandwidth by maintaining operation at the desired wheel slip, using the vehicle speed $v_x$ and the wheel rotational velocity $\omega_x$, obtained, e.g., from the wheel speed sensor 250. The longitudinal wheel slip can also be determined from a speed difference between a driven wheel 102 and a non-driven wheel. Here, a driven wheel is a wheel influenced by any MSD, and a non-driven wheel is a wheel not influenced by any MSD, i.e., that the wheel is rolling freely. The vehicle speed $v_x$ can be obtained from various vehicle sensors such as radar, lidar, and vision-based sensor in combination with a global positioning system (GPS) receiver and the like. Thus, it is appreciated that wheel slip can be determined in a number of different ways, and that the vehicle may implement several of these in a redundant system for increased safety.

The TSM function 270 generates vehicle motion requests 275, which may comprise a desired steering angle δ or an equivalent curvature $c_{req}$ to be followed by the vehicle, and which may also comprise desired vehicle unit accelerations $a_{req}$ and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver.

The VMM function 260 operating with a time horizon of about 1 second or so, continuously transforms the acceleration profiles $a_{req}$ and curvature profiles $c_{req}$ from the TSM function into control commands for controlling vehicle motion functions, actuated by the different MSDs of the vehicle 100 which report back capabilities to the VMM, which in turn are used as constraints in the vehicle control. The VMM function 260 performs vehicle state or motion estimation 510, i.e., the VMM function 260 continuously determines a vehicle state s comprising positions, speeds, accelerations, and articulation angles of the different units in the vehicle combination by monitoring operations using various sensors arranged on the vehicle 100, often but not always in connection to the MSDs.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral $F_y$ and longitudinal $F_x$ forces on the vehicle units, as well as the required moments Mz, to obtain the desired motion by the vehicle combination 100.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 350 arranged in connection to the wheel 210, as discussed above. A tyre model, which was discussed above in connection to FIGS. 3A and 3B, can be used to translate between a desired longitudinal tyre force $Fx_i$ for a given wheel i and an equivalent longitudinal wheel slip $\lambda_i$ for the wheel.

Thus, according to some aspects of the present disclosure, the VMM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM, or to brake the vehicle. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 270.

As mentioned, it is often difficult to obtain an accurate tyre model and it is often challenging to provide the vehicle control system with accurate data such as surface characteristics.

This results in a suboptimal control both in the case a wheel slip limit is imposed or if a specific wheel slip is requested directly from the MSD in a speed controlled mode of operation or in a wheel slip controlled mode of operation.

The present disclosure therefore proposes to dynamically updates a slip target. This increases the chance to avoid vehicle stalling due to a sub-optimum base target slip. The target slip can be purely measurement-based and does not require knowledge about the surface, vehicle, tires, or any other environmental condition known as correlated with friction. It is appreciated that a slip target is in many ways equivalent to a wheel speed target since the wheel slip and the wheel speed are directly related to each other via the vehicle speed $v_x$ as discussed above.

Referring back to FIGS. 3A and 3B, it is desired to be in the linear region 310, 360 (often with some margin) and undesired to be in the non-linear region 320, 370. It has been realized that it is particularly undesired to be in a scenario where the magnitude of the acceleration (which is approximately proportional to tyre force) is decreasing at the same time as magnitude of the longitudinal wheel slip is increasing or being maintained. This is true even if the exact shape tyre model curve is unknown. This scenario corresponds to moving downwards and to the right, i.e., in direction d1 in FIG. 3A, along the curve Fx and upwards to the left, along direction d2 in FIG. 3B, along the curve Fx. The disclosed method therefore controls wheel slip using an algorithm which will interfere by reducing the magnitude of the target slip (forcing the slip closer to zero) as soon as it realizes that the vehicle is losing acceleration magnitude while the slip magnitude is either kept steady or increased. In a sense, the methods disclosed herein try to detect where the peak location 330, 380 of the tyre force curve is by adjusting the target wheel slip in this manner. In a way, as soon as the control unit detects that the vehicle is exhibiting a behavior which is indicative of the directions d1 or d2, the control unit takes steps to back off the wheel slip towards the free rolling wheel state (zero magnitude longitudinal wheel slip).

The methods discussed herein are primarily applicable in case the sign of the longitudinal wheel slip is the same as that of the acceleration, i.e., if the vehicle has a positive acceleration (in the forward or in the reverse direction) and the wheel slip has the same positive sign as the acceleration, or if the vehicle is braking (negative acceleration) and the wheel slip is also negative. The methods disclosed herein may comprise triggering an emergency routine if the monitored acceleration and the current longitudinal wheel slip has different signs. This could, for instance, occur if the vehicle is slipping down a slope and the wheels are spinning in the reverse direction. Such emergency routines are out of scope of the present disclosure.

Figure 8:
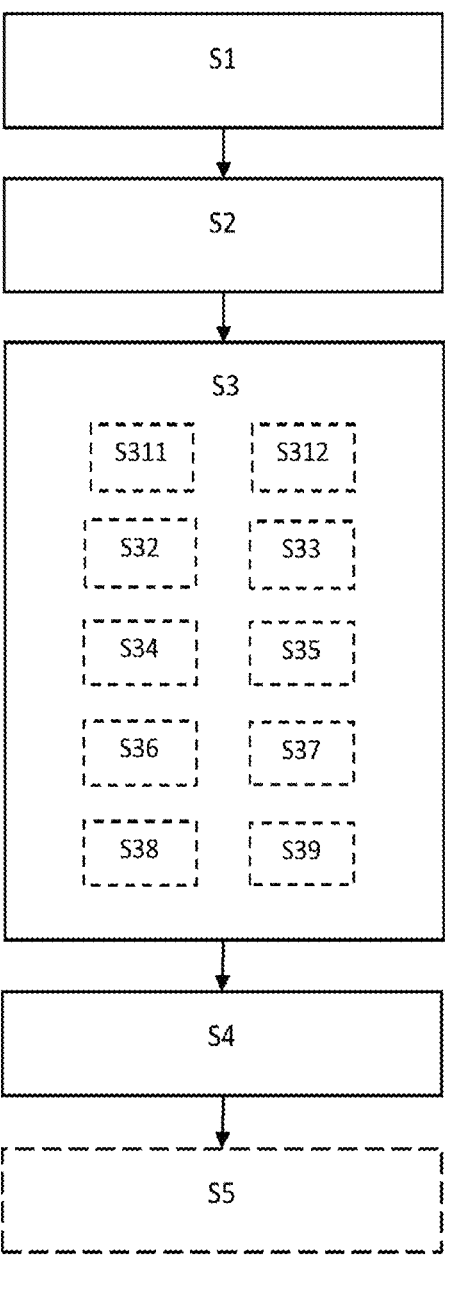
FIG. 8 is a flow chart illustrating methods.

With reference to the flow chart in FIG. 8, there is disclosed herein a method for controlling motion by a heavy-duty vehicle 100, wherein the vehicle is arranged to be controlled based on a target longitudinal wheel slip $\lambda_{target}(k+1)$ of at least one driven wheel 102 on the vehicle. The method comprises monitoring S1 a signed acceleration $v'_x(k)$ of the vehicle 100 and also monitoring S2 a signed current longitudinal wheel slip $\lambda_x(k)$ of the at least one driven wheel 102. If the monitored acceleration and the current longitudinal wheel slip has the same sign, the method entails reducing S3 a magnitude of the target longitudinal wheel slip $\lambda_{target}(k+1)$ of the at least one driven wheel 102 in case a magnitude of the monitored acceleration $v'_x(k)$ of the vehicle 100 decreases while the magnitude of the monitored current longitudinal wheel slip $\lambda_x(k)$ is non-decreasing, and controlling S4 wheel slip of the at least one driven wheel 102 based on the target longitudinal wheel slip $\lambda_{target}(k+1)$, where k is a time index.

If the vehicle is being accelerated in the forward or in the reverse direction, i.e., during vehicle propulsion where the longitudinal wheel slip is of the same sign as the acceleration, the method comprises monitoring an acceleration $v'_x(k)$ of the vehicle 100, monitoring a current longitudinal wheel slip $\lambda_x(k)$ of the at least one driven wheel 102, reducing S311 the target longitudinal wheel slip $\lambda_{target}(k+1)$ of the at least one driven wheel 102 in case the monitored acceleration $v'_x(k)$ of the vehicle 100 decreases while the monitored current longitudinal wheel slip $\lambda_x(k)$ is non-decreasing, and controlling wheel slip of the at least one driven wheel 102 based on the target longitudinal wheel slip $\lambda_{target}(k+1)$.

The method may also be performed during braking, i.e., performed when the signed acceleration $v'_x(k)$ of the vehicle 100 is a negative acceleration and the signed current longitudinal wheel slip $\lambda_x(k)$ is a negative wheel slip, corresponding to a vehicle braking operation (while forwarding or reversing). The method then comprises increasing S312 the target longitudinal wheel slip $\lambda_{target}(k+1)$ of the at least one driven wheel 102 (making it less negative) in case the monitored acceleration $v'_x(k)$ of the vehicle 100 increases (becomes less negative) while the monitored current longitudinal wheel slip $\lambda_x(k)$ is non-increasing or decreasing (becoming more negative).

The method thus sets a new target wheel slip, i.e., a reduced magnitude target wheel slip, when it is observed that current wheel slip and current acceleration are both changing in an undesired way, i.e., the monitored acceleration $v'_x(k)$ of the vehicle 100 decreases in magnitude while the monitored current longitudinal wheel slip $\lambda_x(k)$ is maintained or is increasing in magnitude.

The target wheel slip can be a wheel slip limit where the controlling of wheel slip means to impose an upper wheel slip limit. Alternatively, the target wheel slip can be a value for a direct wheel slip request or for a wheel speed request (then configured in dependence of vehicle speed). In any case, when the current wheel slip and the current acceleration are both changing in an undesired way, it is desired to reduce the target wheel slip.

The monitoring and control of wheel slip can be applied to a single wheel of the vehicle. Alternatively, the monitoring and control can be applied to a plurality of wheels. In that case, the monitoring and control may be individual for each driven wheel. Alternatively, or in combination of, the monitoring and control may utilize some averaging for a plurality of wheels. For example, an average wheel slip can be monitored, and a plurality of wheels are then controlled based on a single target wheel slip.

Figure 4A:
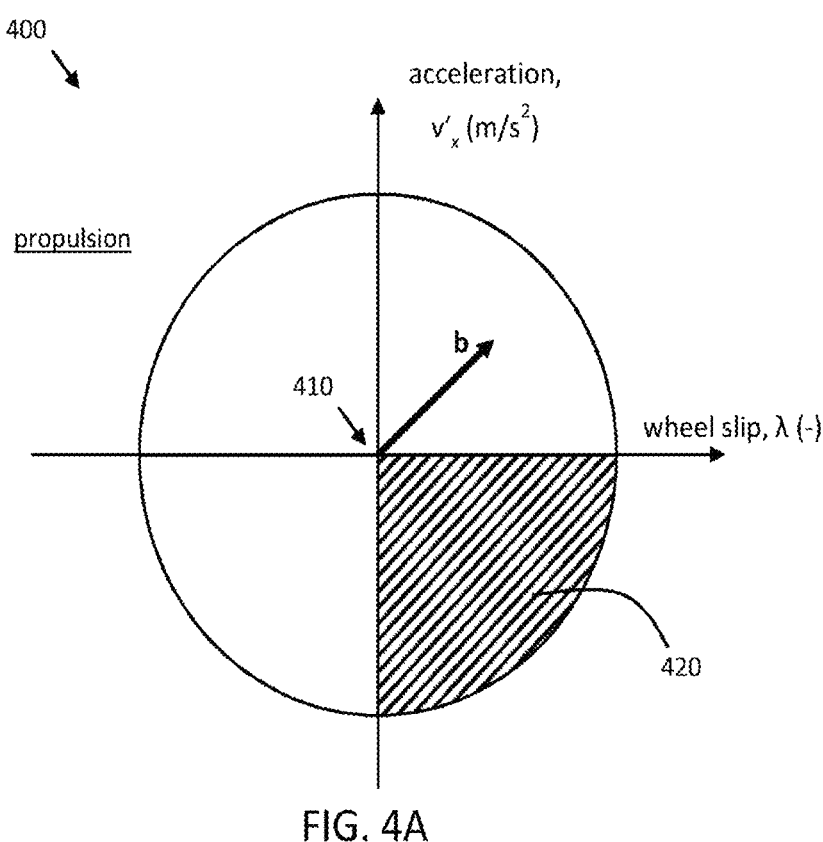
FIGS. 4A-B schematically illustrate wheel slip control rules.
Figure 4B:
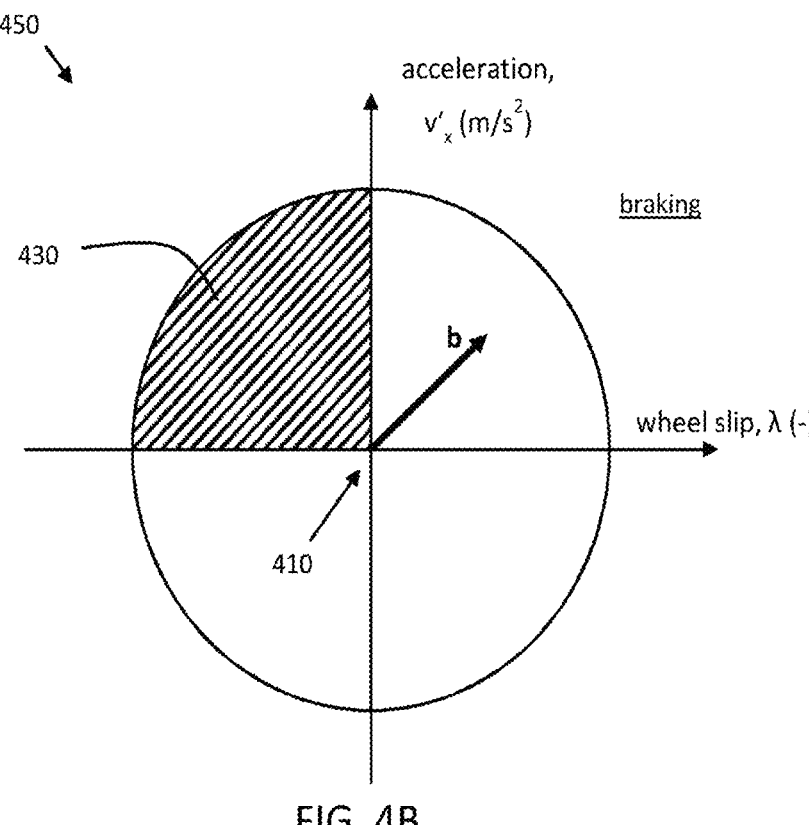

FIGS. 4A and 4B are plots 400, 450 showing acceleration versus slip in a propulsion scenario (plot 400) and in a braking scenario (plot 450). Here, b(k) is a vector representing a change in acceleration and a change in slip, where k is representing time (a single time instance or some time period). More specifically, $$b(k) = [\Delta\lambda(k), \Delta v'_x(k)], \text{ where}$$

$$\Delta\lambda(k) = \lambda(k) - \lambda(k-1), \text{ and}$$

$$\Delta v'_x(k) = \Delta v'_x(k) - \Delta v'_x(k-1).$$

The vector b(k) can point in any direction. Note that the origin 410 does not represent zero values for the acceleration and slip; it is merely a starting point (at a previous time instance). The vector points at the current acceleration and slip. In the particular examples of FIGS. 4A and 4B, the vector starts at the origin and point northeast (up and to the right). This corresponds to an increase in both acceleration and slip. According to the disclosed method, the target longitudinal wheel slip $\lambda_{target}(k+1)$ is reduced in magnitude if the magnitude of the acceleration $v'_x(k)$ decreases while the magnitude of the wheel slip $\lambda_x(k)$ is non-decreasing.

This corresponds to the vector b(k) pointing southeast or directly south in FIG. 4A 420 (for positive acceleration and wheel slip) and northwest or north in FIG. 4B 430 (for the braking scenario).

The acceleration $v'_x(k)$ and the current longitudinal wheel slip $\lambda_x$ (k) are monitored over time, which makes it possible to observe changes over time. To determine a change $\Delta\lambda_x(k)$, $\Delta v'_x(k)$ can mean to compare a current vale to a previous value. The current value and/or the previous value may be a single value at a single time instance or be some average value over a period of time. The current value, the previous value, and/or the difference can be filtered to, e.g., account for noise.

In a curve on a road, the ground acceleration may be slightly different from the longitudinal acceleration in the longitudinal direction of the driven wheel. The ground acceleration can be in the extension direction of the truck, of a part of a vehicle combination, or of some average of a vehicle combination. Preferably, the disclosed method uses the longitudinal acceleration in the longitudinal direction of the driven wheel, which can be related to a tyre model. However, using the ground acceleration instead would also provide the same technical effect of improved vehicle control. Furthermore, there is often not a significant difference between the different accelerations. In other words, the acceleration $v'_x(k)$ preferably is a longitudinal acceleration of the driven wheel 102. If a plurality of wheels are monitored and controlled, an individual acceleration value may be observed for each wheel since different wheels may be turned in different directions.

The acceleration $v'_x(k)$ may be obtained from an accelerometer, which can include both pitch (inclination) and the vehicle ground acceleration. The acceleration can be obtained in other ways as well, such as from the speed of the vehicle 100. Any such data can be obtained by various vehicle sensors such as radar, lidar, and vision-based sensor in combination with a global positioning system (GPS) receiver and the like.

Normally, the measured current wheel slip is almost exactly the same value as the request if wheel slip is controlled by a direct wheel slip request. Furthermore, the current value is normally always equal or less than the target if wheel slip is controlled by a wheel slip limit. Therefore, normally $\lambda_x(k) \leq \lambda_{target}(k)$ no matter how the wheel slip is controlled.

According to aspects, an upcoming wheel slip target is based on either the current measured value or the previous target value. In other words, the target longitudinal wheel slip $\lambda_{target}(k+1)$ may be determined S32 based on the current longitudinal wheel slip $\lambda_x(k)$. For example, the reduction S3 of the target longitudinal wheel slip $\lambda_{target}(k+1)$ in magnitude may be a reduction from the current longitudinal wheel slip $\lambda_x(k)$, i.e., $\lambda_{target}(k+1)=\lambda_x(k)$−offset. Different examples of how the offset can be selected are discussed below. The current longitudinal wheel slip can be a single value at a time instance or some average value over a period of time. This value may also be filtered to, e.g., account for noise.

The target longitudinal wheel slip $\lambda_{target}(k+1)$ may be determined S33 based on a previous target longitudinal wheel slip $\lambda_{target}(k)$. For example, the reduction S3 of the target longitudinal wheel slip $\lambda_{target}(k+1)$ in magnitude may be a reduction from previous target longitudinal wheel slip $\lambda_{target}(k)$, i.e., $\lambda_{target}(k+1)=\lambda_{target}(k)$−offset. Different examples of how the offset can be selected are discussed below. The previous target wheel slip can mean a previous value at a previous time instance or some average value over a period of time. This value may also be filtered to, e.g., account for noise.

As mentioned, it is undesired to move into the non-linear regions 320, 370 in the inverse tyre model 300, 350. However, it can be desirable to increase the wheel slip rather than decreasing it. This way, it may be possible to hit the peak of the curve, i.e., the maximum possible acceleration given some surface condition. This is particularly advantageous if the tyre model is inaccurate or suboptimal. In other words, the method may comprise increasing S34 the magnitude of the target longitudinal wheel slip $\lambda_{target}(k+1)$ of the at least one driven wheel 102 in case the monitored acceleration $v'_x(k)$ of the vehicle 100 does not decrease in magnitude while the monitored current longitudinal wheel slip $\lambda_x$ (k) is non-decreasing in magnitude.

The target wheel slip $\lambda_{target}(k+1)$ may be determined S36 based on a change in acceleration $\lambda v'_x(k)$. For example, the reduction S3 of the target longitudinal wheel slip $\lambda_{target}(k+1)$ may be a reduction from the current longitudinal wheel slip $\lambda_x$ (k) by the change in acceleration $\lambda v'_x(k)$, i.e., $\lambda_{target}(k+1)=\lambda_x(k)-\lambda v'_x(k)$. Various ways of obtaining this change was discussed above. The change in acceleration may be assigned with some factor for normalization and/or weighting purposes, i.e., $w_2\Delta v'_x(k)$. The change is preferably normalized to obtain a unitless value. It may, e.g., be normalized with the current value $v'_x(k)$ or with the previous value $\lambda v'_x(k-1)$. The factor $w_2$ may alternatively, or in combination of, comprise a weight for adjusting the effect the acceleration change has on the new target wheel slip $\lambda_{target}(k+1)$.

The target wheel slip $\lambda_{target}(k+1)$ may also be determined S37 based on a change in current longitudinal wheel slip $\Delta\lambda_x(k)$. For example, the reduction S3 of the target longitudinal wheel slip $\lambda_{target}(k+1)$ may be a reduction from the current longitudinal wheel slip $\lambda_x$ (k) by the change in wheel slip $\Delta\lambda_x(k)$, i.e., $\lambda_{target}(k+1)=\lambda_x(k)-\Delta\lambda_x(k)$. Various ways of obtaining this change was discussed above. The change in wheel slip may be assigned with some factor for normalization and/or weighting purposes, i.e., $w_1\Delta\lambda_x(k)$. The factor $w_1$ may be a weight for adjusting the effect the wheel slip change has on the new target wheel slip.

The target wheel slip $\lambda_{target}(k+1)$ may furthermore be determined S38 based on a weighted combination $w_1$, $w_2$ of the change in acceleration $\lambda v'_x(k)$ and the change in current longitudinal wheel slip $\Delta\lambda_x(k)$. For example, the reduction S3 of the target longitudinal wheel slip $\lambda_{target}(k+1)$ may be a reduction from the current longitudinal wheel slip $\lambda_x(k)$ by the change in both acceleration $\lambda v'_x(k)$ and in wheel slip $\Delta\lambda_x(k)$ and, i.e., $\lambda_{target}(k+1)=\lambda_x(k)-|b(k)|$, where $b(k)=[w_1\Delta\lambda_x(k), w_2\Delta\lambda v'_x(k)]$. This way, the factors $w_1$, $w_2$ can be selected to adjust the relative importance of the acceleration change and the wheel slip change has on the new target wheel slip. As mentioned, the factors $w_1$, $w_2$ can comprise weighting and/or normalization.

The target wheel slip $\lambda_{target}(k+1)$ may be determined S39 based on the change in acceleration $\lambda v'_x(k)$ and the change in current longitudinal wheel slip $\Delta\lambda_x(k)$ together with a loop gain factor $k_r$, $k_d$. For example, the reduction S3 of the target longitudinal wheel slip $\lambda_{target}(k+1)$ may be $\lambda_{target}(k+1)=\lambda_x(k)-k_r|b(k)|$. The loop gain factor may be different depending on direction of the vector b(k). For example, the loop gain factor $k_r$, $k_d$ may be different whether or not the monitored acceleration $v'_x(k)$ of the vehicle 100 decreases while the monitored current longitudinal wheel slip $\lambda_x$ (k) is non-decreasing. In other words, if the vector b(k) points southeast or south, it may have a value $k_r$, and if the vector b(k) points in any other direction, it may have another value $k_d$.

Of course, any combination of the above mechanisms for determining target wheel slip can also be used, possibly in a weighted manner.

The loop gain factor $k_r$, kd and/or factors $w_1$, $w_2$ in the weighted combination may be dynamically updated based on a current driving scenario. The relative importance of the acceleration change compared to the wheel slip change may be different for different scenarios, such as different ground conditions with different friction. Similarly, it may be desired to adjust the change rate (i.e., the loop gain) for different scenarios.

According to an example embodiment of the disclosed method, the target longitudinal wheel slip for the propulsion case is determined as $$\lambda_{target}(k+1) = \begin{cases} \lambda_x(k) - k_d|b(k)| & \text{if } (\Delta\lambda_x(k) \geq 0 \text{ and } \Delta v'_x(k) < 0) \\ \lambda_{target}(k) + k_r|b(k)| & \text{otherwise} \end{cases}, \text{ where}$$

$$b(k) = [w_1\Delta\lambda_x(k), w_2\Delta v'_x(k)],$$

$$\Delta\lambda_x(k) = \lambda_x(k) - \lambda_x(k-1), \text{ and}$$

$$\Delta v'_x(k) = v'_x(k) - v'_x(k-1).$$

Here, $w_1$, $w_2$ are factors for normalization and/or weighting, $k_d$ is a drop loop gain factor, $k_r$ is a rise loop gain factor. In addition, $k_d >> k_r$. e.g., by a factor of 10. The target wheel slip is thus determined based on the orientation and length of the vector b(k). The new target wheel slip is reduced proportionally to |b(k)| if the direction is southeast or south (i.e., a decreasing acceleration while the current wheel slip is either maintained or is increasing); and is increased proportionally to |b(k)| otherwise. The same mechanism can of course be applied for the braking scenario, which straight forward adaptation.

When the target wheel slip is decreasing in magnitude, the new target is calculated based on the current measured slip, whereas it is calculated based on a previous target wheel slip when it is increasing in magnitude. Iterating the method with iterations of immediate reduction and progressive gain tends to stabilize around a certain value, meaning that, in an unlikely steady-state situation, the slip target becomes asymptotically stable.

According to aspects, in the example of FIG. 4A, the target wheel slip is reduced both when the vector b(k) points south/southeast and when it points northwest. In other words, the method may comprise reducing S35 the magnitude of the target longitudinal wheel slip $\lambda_{target}(k+1)$ of the at least one driven wheel 102 in case the monitored acceleration $v'_x(k)$ of the vehicle 100 increases in magnitude while the monitored current longitudinal wheel slip $\lambda_x(k)$ decreases in magnitude. In some scenarios, this results in the vehicle reaching peak acceleration faster. In an example embodiment, for the propulsion case, this can be described as $$\lambda_{target}(k+1) = \begin{cases} \lambda_x(k) - k_d|b(k)| & \text{if } [(\Delta\lambda_x(k) \geq 0 \text{ and } \Delta v'_x(k) < 0) \text{ or} \\ & (\Delta\lambda_x(k) < 0 \text{ and } \Delta v'_x(k) > 0)] \\ \lambda_{target}(k) + k_r|b(k)| & \text{otherwise} \end{cases} .$$

Figure 6:
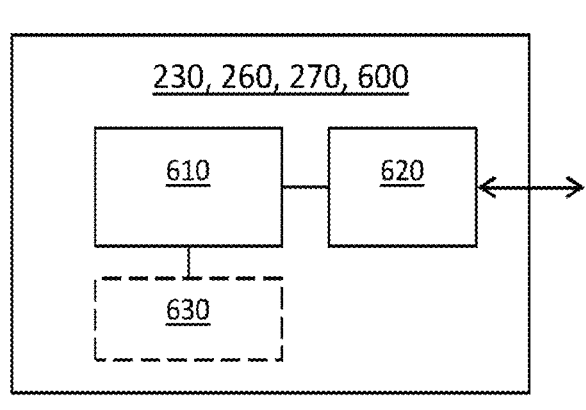
FIG. 6 schematically illustrates a control unit.

FIG. 6 schematically illustrates, in terms of a number of functional units, the components of a control unit 230, 260, 270, 600 according to an embodiment of the discussions herein. Processing circuitry 610 is provided using any combination of one or more of a suitable central processing unit CPU, multiprocessor, microcontroller, digital signal processor DSP, etc., capable of executing software instructions stored in a computer program product, e.g., in the form of a storage medium 630. The processing circuitry 610 may further be provided as at least one application specific integrated circuit ASIC, or field programmable gate array FPGA.

Particularly, the processing circuitry 610 is configured to cause the control unit 230, 260, 270, 600 to perform a set of operations, or steps, such as the methods discussed in connection to FIG. 8. For example, the storage medium 630 may store the set of operations, and the processing circuitry 610 may be configured to retrieve the set of operations from the storage medium 630 to cause the control unit 230, 260, 270, 600 to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The control unit 230, 260, 270, 600 may further comprise an interface 620 for communications with at least one external device. As such the interface 620 may comprise one or more transmitters and receivers, comprising analogue and digital components and a suitable number of ports for wireline or wireless communication.

The processing circuitry 610 controls the general operation of the control unit 230, 260, 270, 600 e.g., by sending data and control signals to the interface 620 and the storage medium 630, by receiving data and reports from the interface 620, and by retrieving data and instructions from the storage medium 630. Other components, as well as the related functionality, of the control node are omitted in order not to obscure the concepts presented herein.

In other words, there is disclosed herein a control unit 230, 260, 270, 600 for controlling motion by a heavy-duty vehicle 100, wherein the vehicle is arranged to be controlled based on a target longitudinal wheel slip $\lambda_{target}(k+1)$ of at least one driven wheel 102 on the vehicle, wherein the control unit comprises: processing circuitry 610; a network interface 620 coupled to the processing circuitry 610; and a memory 630 coupled to the processing circuitry 610, wherein the memory comprises machine readable computer program instructions that, when executed by the processing circuitry, causes the control unit 230, 260, 270, 600 to monitor a signed acceleration $v'_x(k)$ of the vehicle 100, monitor a signed current longitudinal wheel slip $\lambda_x(k)$ of the at least one driven wheel 102, reduce a magnitude of the target longitudinal wheel slip $\lambda_{target}(k+1)$ of the at least one driven wheel 102 in case a magnitude of the monitored acceleration $v'_x(k)$ of the vehicle 100 decreases while the magnitude of the monitored current longitudinal wheel slip $\lambda_x(k)$ is non-decreasing, and control wheel slip of the at least one driven wheel 102 based on the target longitudinal wheel slip $\lambda_{target}(k+1)$.

Figure 7:
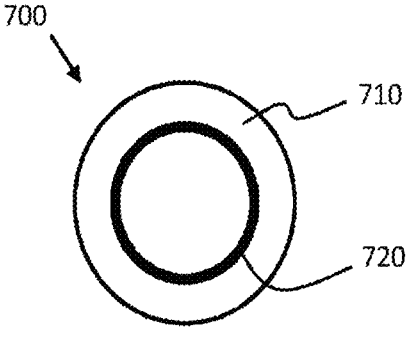
FIG. 7 shows an example computer program product.

FIG. 7 schematically illustrates a computer program product 700, comprising a set of operations 720 executable by the control unit 230, 260, 270, 600. The set of operations 720 may be loaded into the storage medium 630 in the control unit. The set of operations may correspond to the methods discussed above in connection to FIG. 8.

In the example of FIG. 7, the computer program product 700 is illustrated as an optical disc 710, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program is here schematically shown as a track on the depicted optical disk, the computer program can be stored in any way which is suitable for the computer program product.

The invention claimed is:

1. A method for controlling motion by a heavy-duty vehicle, wherein the vehicle is arranged to be controlled based on a target longitudinal wheel slip of at least one driven wheel on the vehicle, the method comprising monitoring a signed acceleration of the vehicle, monitoring a signed current longitudinal wheel slip of the at least one driven wheel, and, if the monitored acceleration and the current longitudinal wheel slip has the same sign, reducing a magnitude of the target longitudinal wheel slip of the at least one driven wheel in case a magnitude of the monitored acceleration of the vehicle decreases while the magnitude of the monitored current longitudinal wheel slip is non-decreasing, and controlling wheel slip of the at least one driven wheel based on the target longitudinal wheel slip.

2. The method according to claim 1, wherein the sign of the monitored acceleration and the sign of the current longitudinal wheel slip is defined relative to a reference vehicle speed direction.

3. The method according to claim 1, wherein the target longitudinal wheel slip after reduction is determined based on the current longitudinal wheel slip.

4. The method according to claim 1, wherein the target longitudinal wheel slip after reduction is determined based on a previous target longitudinal wheel slip.

5. The method according to claim 1, comprising increasing the magnitude of the target longitudinal wheel slip of the at least one driven wheel in case the magnitude of the monitored acceleration of the vehicle does not decrease while the magnitude of the monitored current longitudinal wheel slip is non-decreasing.

6. The method according to claim 1, comprising reducing the magnitude of the target longitudinal wheel slip of the at least one driven wheel in case the magnitude of the monitored acceleration of the vehicle increases while the magnitude of the monitored current longitudinal wheel slip decreases.

7. The method according to claim 1, wherein the target wheel slip is determined based on a change in acceleration.

8. The method according to claim 1, wherein the target wheel slip is determined based on a change in current longitudinal wheel slip.

9. The method according to claim 7, wherein the target wheel slip is determined based on a weighted combination of the change in acceleration and the change in current longitudinal wheel slip.

10. The method according to claim 7, wherein the target wheel slip is determined based on the change in acceleration and the change in current longitudinal wheel slip together with a loop gain factor.

11. The method according to claim 10, wherein the loop gain factor is different whether or not the magnitude of the monitored acceleration of the vehicle decreases while the magnitude of the monitored current longitudinal wheel slip is non-decreasing.

12. The method according to claim 10, wherein the loop gain factor and/or factors in the weighted combination are dynamically updated based on a driving scenario.

13. The method according to claim 1, wherein the current longitudinal wheel slip is determined from a speed difference between a driven wheel and a non-driven wheel.

14. The method according to claim 1, wherein the acceleration is obtained from an accelerometer.

15. The method according to claim 1, wherein the acceleration is obtained from a speed of the vehicle.

16. The method according to claim 1, wherein the acceleration is a longitudinal acceleration of the driven wheel.

17. The method according to claim 1, comprising triggering an emergency routine if the monitored acceleration and the current longitudinal wheel slip has different signs.

18. A control unit for controlling motion by a heavy-duty vehicle, wherein the vehicle is arranged to be controlled based on a target longitudinal wheel slip of at least one driven wheel on the vehicle, wherein the control unit comprises: processing circuitry; a network interface coupled to the processing circuitry; and a memory coupled to the processing circuitry, wherein the memory comprises machine readable computer program instructions that, when executed by the processing circuitry, causes the control unit to monitor a signed acceleration of the vehicle, monitor a signed current longitudinal wheel slip of the at least one driven wheel, reduce a magnitude of the target longitudinal wheel slip of the at least one driven wheel in case a magnitude of the monitored acceleration of the vehicle decreases while the magnitude of the monitored current longitudinal wheel slip is non-decreasing, and control wheel slip of the at least one driven wheel based on the target longitudinal wheel slip.

* * * * *